(12) United States Patent
Keates et al.

(10) Patent No.: US 10,784,474 B2
(45) Date of Patent: Sep. 22, 2020

(54) CELLULAR FLEXIBLE BATTERY CELLS

(71) Applicant: INTEL CORPORATION, Santa Clara, CA (US)

(72) Inventors: Andrew Keates, Los Gatos, CA (US); Naoki Matsumura, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 955 days.

(21) Appl. No.: 15/085,997

(22) Filed: Mar. 30, 2016

(65) Prior Publication Data

US 2017/0288179 A1    Oct. 5, 2017

(51) Int. Cl.
*H01M 2/02* (2006.01)
*H01M 10/04* (2006.01)
*H01M 4/76* (2006.01)
*H01M 2/16* (2006.01)
*H01M 4/36* (2006.01)

(52) U.S. Cl.
CPC ....... *H01M 2/0275* (2013.01); *H01M 2/0207* (2013.01); *H01M 2/0287* (2013.01); *H01M 2/1653* (2013.01); *H01M 4/368* (2013.01); *H01M 4/76* (2013.01); *H01M 10/0436* (2013.01); *H01M 2220/30* (2013.01)

(58) Field of Classification Search
CPC .... H01M 2/0275; H01M 2/0287; H01M 4/76; H01M 10/0436
See application file for complete search history.

(56) References Cited

U.S. PATENT DOCUMENTS

| | | | |
|---|---|---|---|
| 6,528,204 B1 * | 3/2003 | Hikmet | H01M 4/13 429/128 |
| 9,132,031 B2 | 9/2015 | Levinson et al. | |
| 2004/0185334 A1 | 9/2004 | Iwamoto | |
| 2009/0081553 A1 * | 3/2009 | Kondo | H01M 2/021 429/314 |
| 2016/0156005 A1 | 6/2016 | Elliot et al. | |

FOREIGN PATENT DOCUMENTS

| | | | | |
|---|---|---|---|---|
| JP | S59117073 A | | 7/1984 | |
| JP | 2015-115196 | * | 6/2015 | ........ H01M 10/0565 |

OTHER PUBLICATIONS

International Search Report received for PCT Patent Application No. PCT/US2017/024849, dated Jul. 18, 2017, 3 pages.

* cited by examiner

*Primary Examiner* — Osei K Amponsah

(57) ABSTRACT

These present disclosure provides a flexible battery comprising a top layer and a bottom layer coupled at a number of attachment points to form chambers within the battery to retain a shape of the battery under an increase in internal pressure. The flexible battery can include an anode and separator and a cathode, where the separator is a flexible polymer.

22 Claims, 10 Drawing Sheets

US 10,784,474 B2

CELLULAR FLEXIBLE BATTERY CELLS

TECHNICAL FIELD

Examples described herein are generally related to battery cells and particularly to flexible battery cells and to battery cells built in a cellular manner.

BACKGROUND

Modern batteries are generally constructed as a single entity with a number of materials contained in a single package. In particular, the materials included in the battery cell are typically disposed in a single package. The package is often constructed to constrain or prevent expansion (e.g., due to generation of gas during operation, or the like).

DETAILED DESCRIPTION

As contemplated in the present disclosure, a flexible battery to distribute active materials of the battery across a number of individual cells is provided. In particular, the present disclosure can be implemented to provide a flexible battery having a flexible casing. The flexible casing may comprise a top flexible layer and a bottom flexible layer. The top and bottom flexible layer may be mechanically coupled at a number of attachment points across the layers to form a number of containment cells. The containment cells can contain any gas emitted by the battery cell(s) during operation and can retain the overall shape of the flexible casing. However, the flexible casing, due in part to the top and bottom flexible layer, may remain flexible during use.

Additionally, a flexible battery according to the present disclosure can include a semi-rigid separator disposed between the top and bottom layer with anode material on a first side of the separator and cathode material on a second side of the separator. The separator may also act as an electrolyte during operation of the battery. Furthermore, in some examples, the top and bottom layers can be mechanically coupled at a number of attachment point in a grid or matrix pattern across the flexible battery to form the number of containment cells. The layers can be mechanically coupled, for example, with ultrasonic welding, heat welding, epoxy, or the like. With some implementations, each containment cell can correspond to a battery cell, where the battery cells are electrically coupled in a parallel, series, or combination of parallel and series arrangements.

Accordingly, a flexible battery to maintain a general shape and to contain gasses (e.g., hydrogen, or the like) off gassed during operation of the battery is provided.

Figure 1:
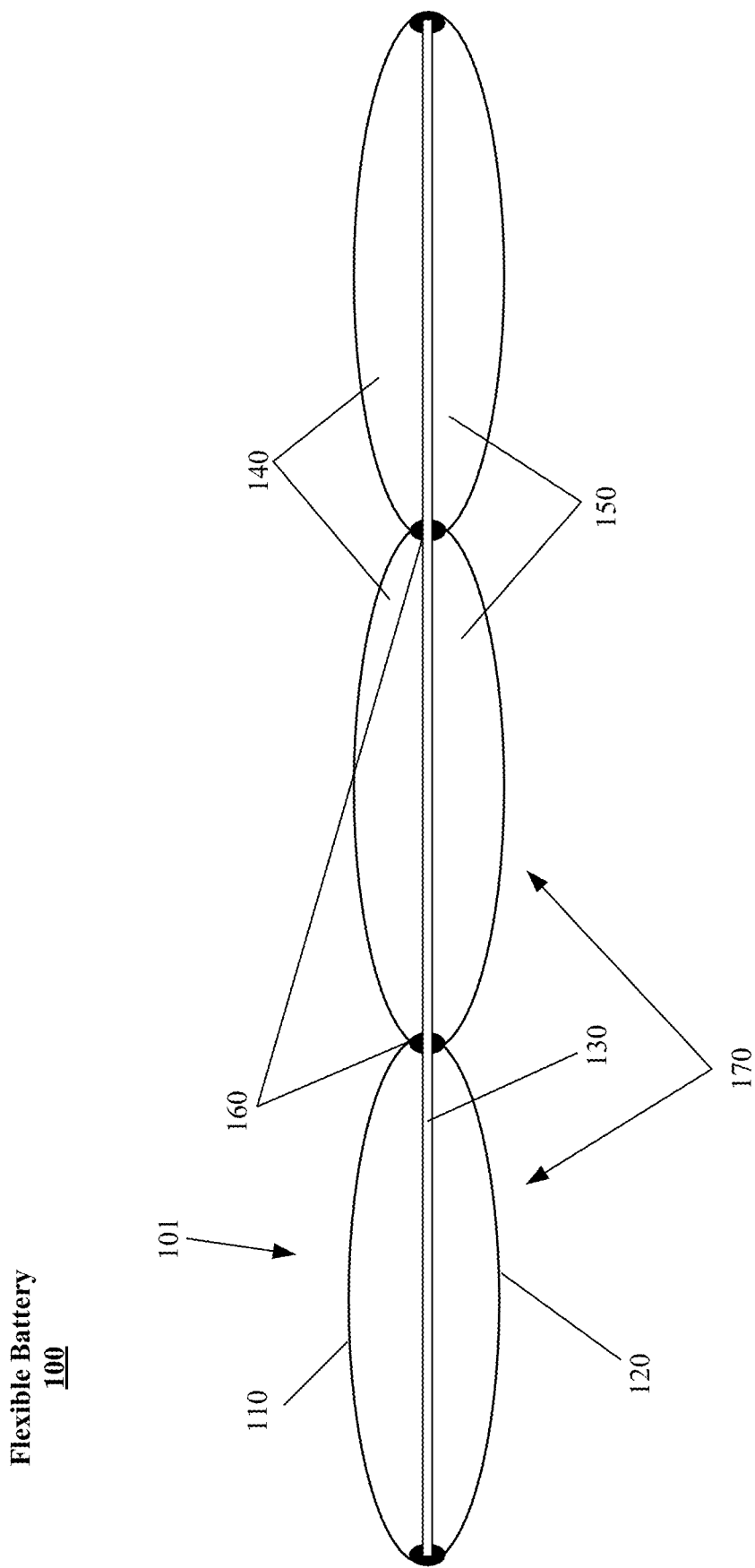
FIG. 1 illustrates an example first flexible battery.

FIG. 1 illustrates an example of a flexible battery 100, arranged according to the present disclosure. In general, the flexible battery 100 is formed from a top flexible layer 110 and a bottom flexible layer 120. In some examples, the top layer 110 and bottom layer 120 may be separate pieces of material joined (e.g., as described herein). With some examples, the top layer 110 and bottom layer 120 may be a single, or the same, piece of material (e.g., like a bag).

The flexible battery 100 includes a separator 130, anode 140, and cathode 150. In general, the separator 130 separates the anode 140 from the cathode 150. More particularly, the separator 130 serves as a barrier to physical contact between the anode 140 and cathode 150 while allowing ions to pass between the anode 140 and cathode 150 (e.g., across the separator 130). More specifically, the separator 130 allows ions from pass from the cathode 150 to the anode 140 while the flexible battery 100 is providing current (e.g., discharging); or to pass from the anode 140 to the cathode 150 while the flexible battery 100 is receiving current (e.g., charging).

The top layer 110 and bottom layer 120 are mechanically attached via a number of attachment points 160. These layers can include a metallic inner surface to operate as a current collector for the active energy-storage materials in the battery chambers. The attachment points 160 are described in greater detail below. However, in general, the attachment points 160 mechanically couple the top layer 110 to the bottom layer 120 forming compartments 170 within the flexible battery 100. During operation, gas pressure (e.g., due to emission of hydrogen gas, or the like) within the flexible battery may increase. However, the compartments 170 may contain the pressure. For example, the attachment points 160 may serve to retain the shape of the flexible battery 100 during operation, and particularly, during periods where internal pressure is increased within the flexible battery. Still, as another example, the attachment points 160 may provide that the flexible battery may not bulge or deform during operation while maintaining a flexibility of the battery 100.

In general, the separator 130, anode 140, and cathode 150 can be formed from any of a variety of suitable materials necessary to provide for battery chemistry. For example, the battery 100 can be a lithium ion battery, a magnesium ion battery, or the like. Specifically, with some example, the separator 130 can be a solid polymer electrolyte, a membrane polymer electrolyte, or the like. In some examples, the separator 130 can include organic carbonates containing lithium ions (e.g., ethylene carbonate, diethyl carbonate, or the like) or non-coordinating anion salts (e.g., lithium hexafluorophosphate, lithium hexafluoroarsenate monohydrate, lithium perchlorate, lithium tetrafluoroborate, and lithium triflate, or the like).

In general, the anode 140 and cathode 150 can be any material to exchange ions to cause a current to flow. For example, the anode 140 and cathode 150 can include a metal or other material to release ions and generate current due to a chemical reaction. With some examples, the anode 140 and cathode 150 can be an aqueous solution, a gel like substance, a solid, or the like. In some examples, the anode 140 can be a layered oxide (e.g., lithium cobalt oxide, or the like), a polyanion (e.g., lithium iron phosphate, or the like), or a spinel (e.g., lithium manganese oxide, or the like). In some examples, the cathode 150 can be graphite, or can contain an amount of graphite.

Figure 2:
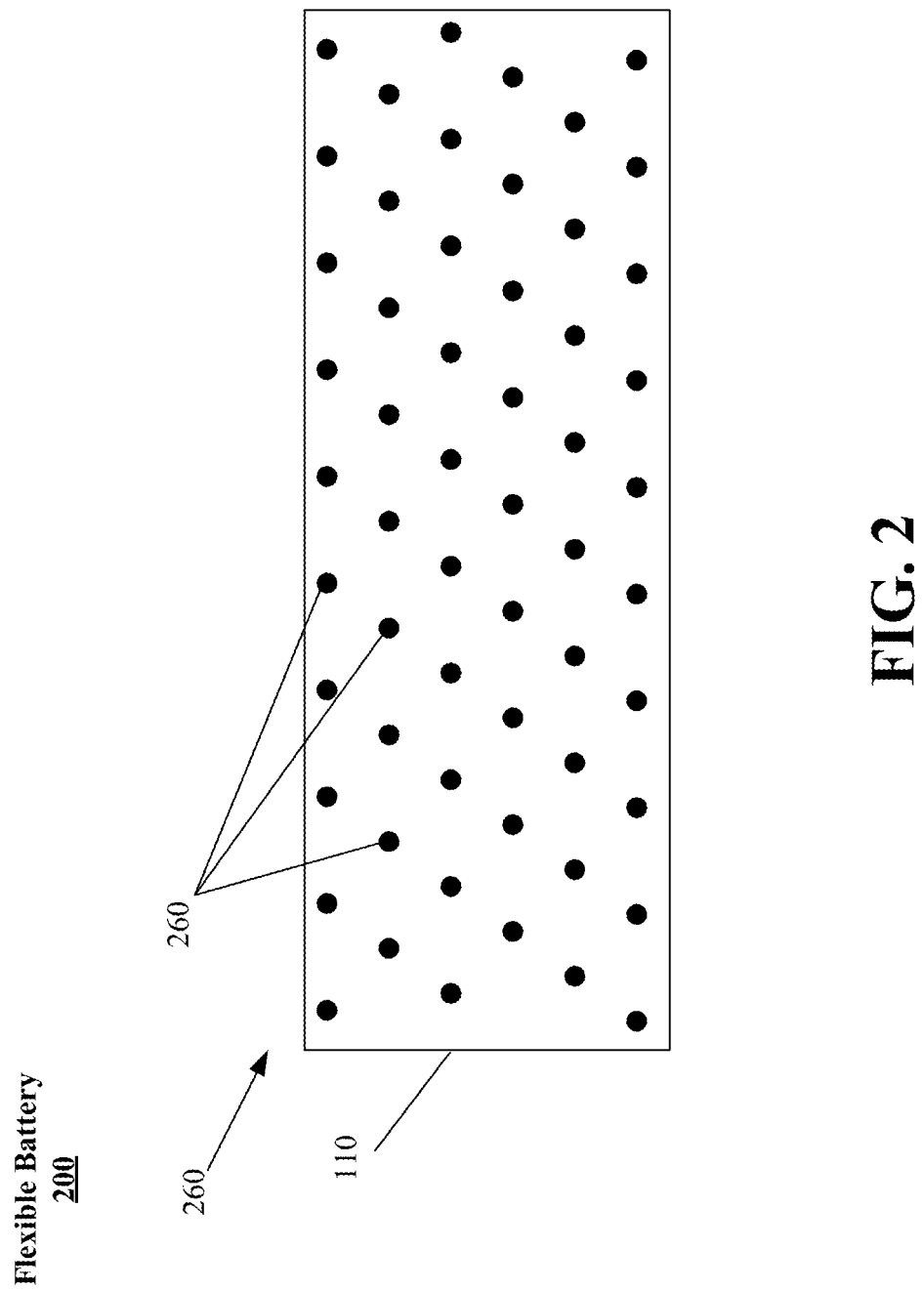
FIGS. 2-3 illustrate cut-away and plan views of an example second flexible battery.
Figure 3:
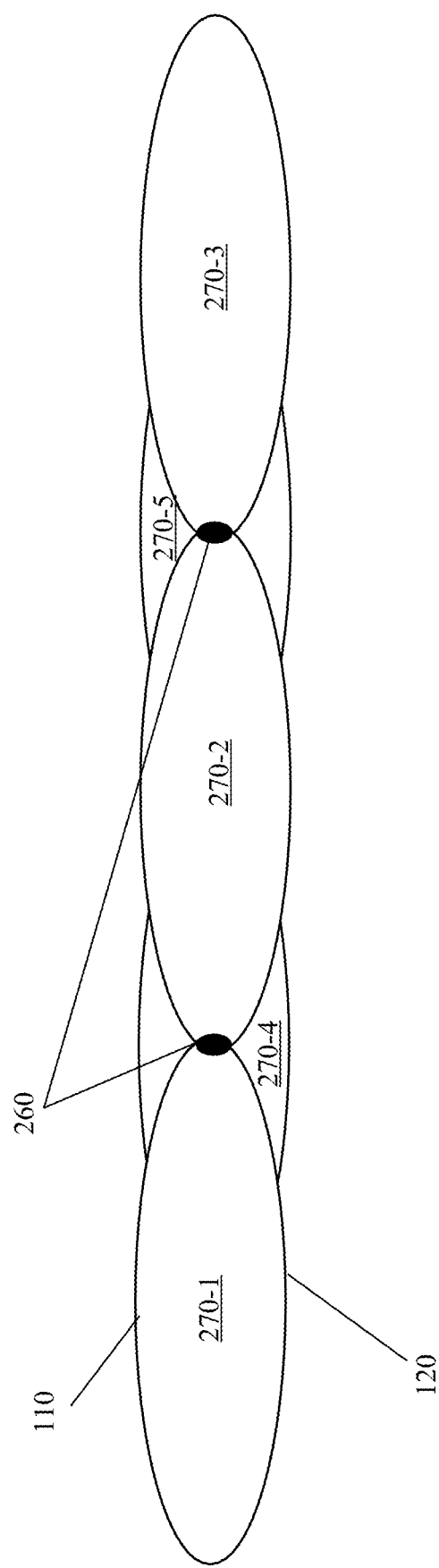

FIGS. 2-3 illustrate an example flexible battery 200. In particular, FIG. 2 illustrates a top view of the flexible battery 200 while FIG. 3 illustrates a side cut away view of the flexible battery 200. It is noted, that the separator layer is omitted from this view for purposes of clarity. It is worthy to note, that the flexible battery 200 is described with respect to the flexible battery 100 of FIG. 1. In particular, similar reference numerals are used to depict the top layer 110, bottom layer 120, separator 130, anode 140, and cathode 150. This is done for convenience and clarity in describing the present disclosure and not to be limiting.

Turning more specifically to FIG. 2 the flexible battery 200 may include top layer 110 and bottom layer 120 (not shown from this perspective). The top layer 110 may be mechanically attached to the bottom layer 120 (not shown from this perspective) via attachment points 260. In some examples, the attachment points 260 can be spot welds. More specifically, the attachment points may be formed by spot welding the top layer 110 to the bottom layer 120 at various points. In some examples, the attachment points 260 may be formed in a grid pattern, a matrix array, or other arrangement sufficient to mechanically couple to the top layer 110 to the bottom layer 120.

Turning more particularly to FIG. 3, the flexible battery 200 is depicted from a side cut away view, showing chambers 270-1, 270-2, 270-3, 270-4, and 270-5. It is worthy to note, that a limited number of chambers are depicted for purposes of clarity, and not to be limiting. Additionally, as noted above, the separator is not depicted for purposes of clarity. As such, in practice, each of the depicted chambers (e.g., 270-1, 270-2, etc.) may correspond to a pair of chambers (e.g., an anode and a cathode chamber, etc.)

In the flexible battery 200, the chambers 270 are connected to each other. Said differently, the battery 200 is open within the battery and the chambers 270 are interconnected. Accordingly, with some examples, the anode 140 and cathode 150 can be aqueous or fluid like while the separator 130 is a flexible polymer electrolyte material. As such, the flexible battery 200 can retain a flexible structure while providing the structure is semi rigid under an increase in internal pressure (e.g., due to emission of gas during operation of the battery 200, or the like).

Figure 4:
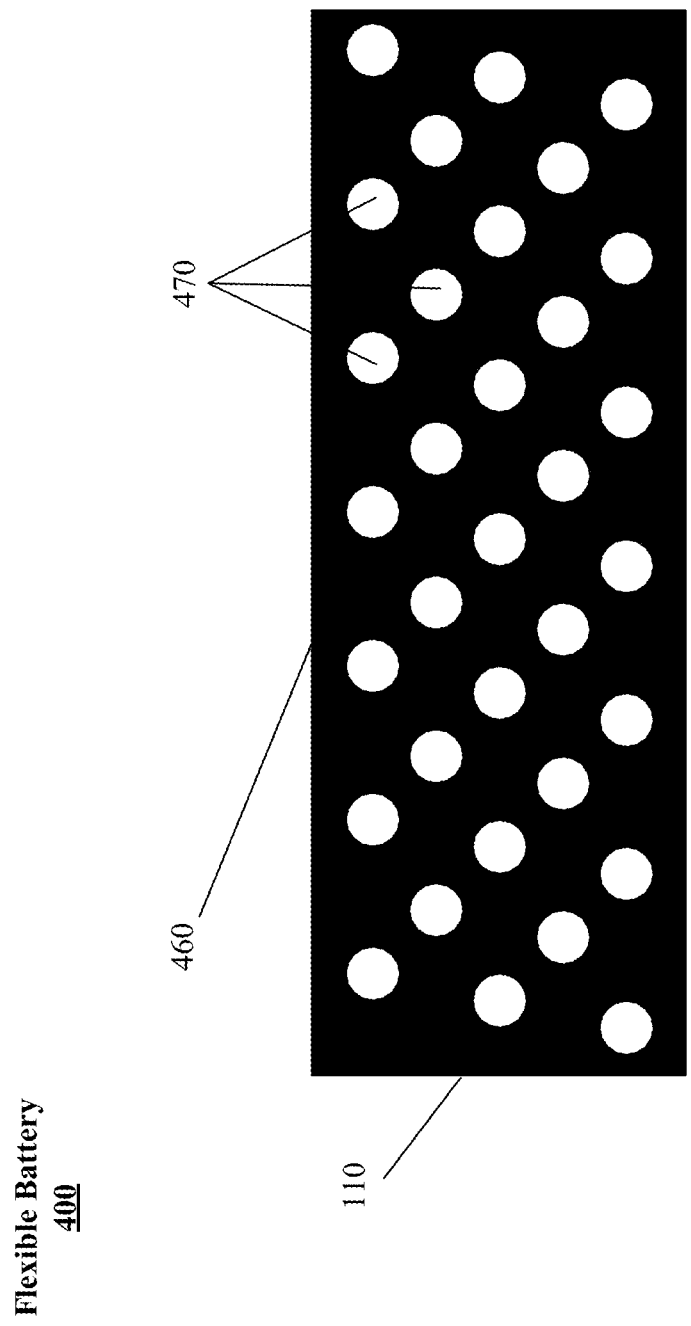
FIGS. 4-5 illustrate cut-away and plan views of an example third flexible battery.
Figure 5:
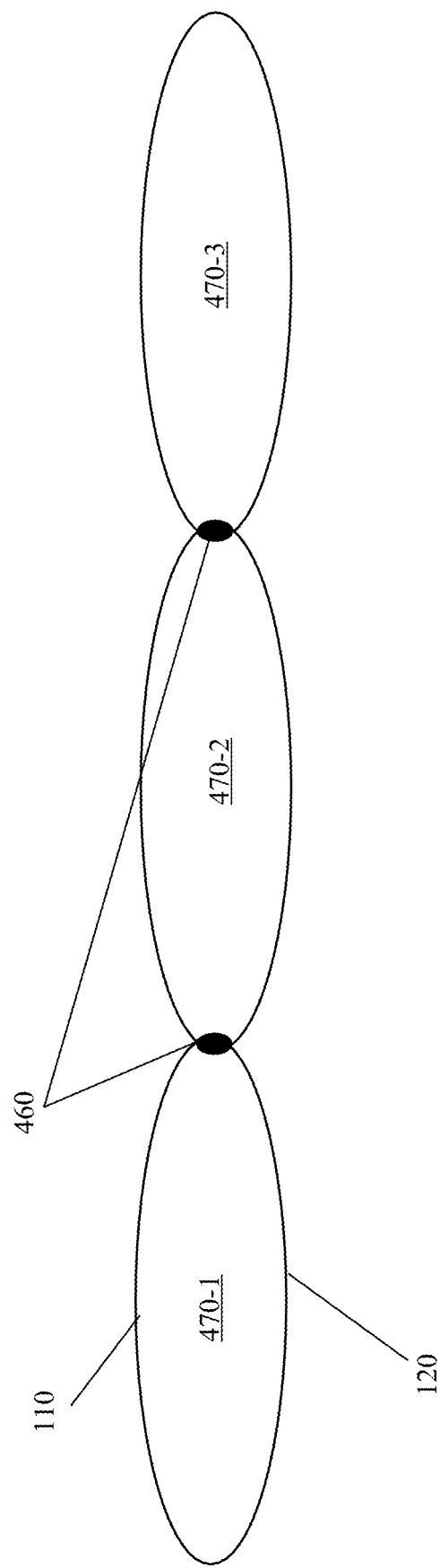

FIGS. 4-5 illustrate an example flexible battery 400. In particular, FIG. 4 illustrates a top view of the flexible battery 400 while FIG. 5 illustrates a side cut away view of the flexible battery 400. It is worthy to note, that the flexible battery 400 is described with respect to the flexible battery 100 of FIG. 1. In particular, similar reference numerals are used to depict the top layer 110, bottom layer 120, separator 130, anode 140, and cathode 150. This is done for convenience and clarity in describing the present disclosure and not to be limiting.

Turning more specifically to FIG. 4 the flexible battery 400 may include top layer 110 and bottom layer 120 (not shown from this perspective). The top layer 110 may be mechanically attached to the bottom layer 120 (not shown from this perspective) via attachment points 460. In some examples, the attachment points 460 can be formed by welding, epoxy, chemical reaction, or the like to mechanically attach the top layer 110 to the bottom layer 120 to from a series of chambers 270. The chambers 270 can be arranged in a grid, matrix, or other arrangement.

Turning more particularly to FIG. 5, the flexible battery 400 is depicted from a side cut away view, showing chambers 470-1, 270-2, and 470-3. It is worthy to note, that a limited number of chambers are depicted for purposes of clarity, and not to be limiting. Furthermore, like FIG. 3, the separator is not depicted for purposes of clarity. In the flexible battery 400, the chambers 470 are not connected to each other. Said differently, the battery 400 is closed between chambers 470 and each chamber 470 is physically separated from each other. In some examples, each of the chambers 470 can be considered a battery cell. As such, the flexible battery 400 can be formed from an electrical (e.g., series, parallel, series-parallel, or the like) configuration of multiple battery cells (e.g., multiple chambers 470, or the like).

Figure 6:
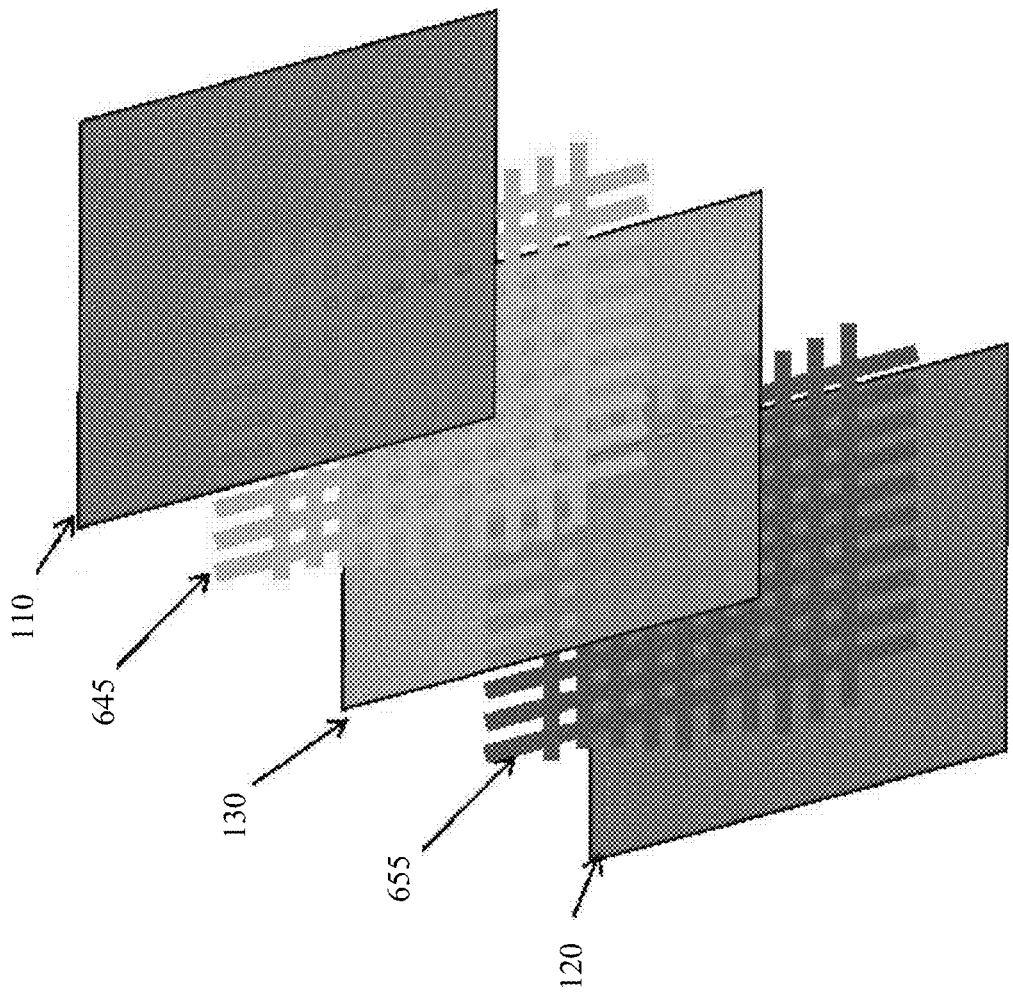
FIGS. 6-7 illustrate perspective and cut-away views of an example fourth flexible battery.
Figure 7:
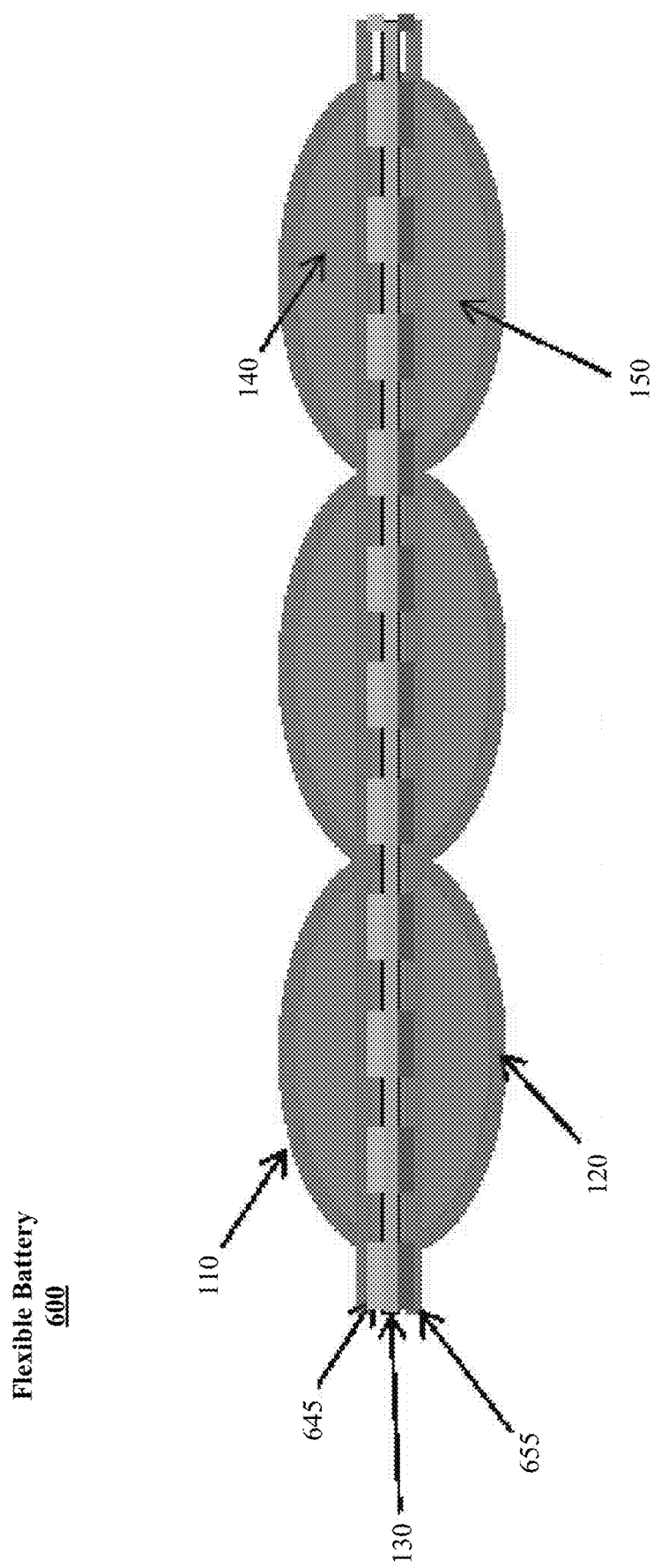

FIGS. 6-7 illustrate examples of a flexible battery 600. In particular, FIG. 6 illustrates an exploded perspective view of the flexible battery 600 while FIG. 7 illustrates an example. It is worthy to note, that the flexible battery 600 is described with respect to the flexible battery 100 of FIG. 1. In particular, similar reference numerals are used to depict the top layer 110, bottom layer 120, separator 130, anode 140, and cathode 150. This is done for convenience and clarity in describing the present disclosure and not to be limiting.

Turning more particularly to FIG. 6, the flexible battery 600 may include top layer 110 and bottom layer 120. The flexible battery 600 may additionally include an anode current collector 645 and a cathode current collection 655. The anode current collector 645 may be disposed between the separator 130 and the top layer 110 while the cathode current collector 655 may be disposed between the separator 130 and the bottom layer 120. In some examples, the anode current collector 645 and the cathode current collector 655 can be formed from a metallic material and, in some example, may have a mesh structure as depicted. The anode current collector 645 can be attached to the top layer 110 and the separator 130 by any of a variety of methods, such as, for example, welding, epoxy, or the like. Similarly, the cathode current collector 655 can be attached to the bottom layer 120 and the separator 130 by any of a variety of methods, such as, for example, welding, epoxy, or the like.

Turning more specifically to FIG. 7, the flexible battery 600 is depicted assembled from a side cut away view. In particular, the flexible battery 600 is depicted including the top layer 110, bottom layer 120, separator 130, the anode material 140, the anode current collector 645, the cathode material 150, and the cathode current collector 655. The components of the flexible battery 600 are arranged as depicted and described and assembled to form the battery 600. In particular, the components can be mechanically attached at attachment points to form chambers. In some examples, the flexible battery 600 can be assembled and the top layer 110 mechanically attached to the bottom layer 120 via attachment points to form an open cell structure of chambers (e.g., like the chambers 270 of FIG. 3). With some examples, the flexible battery 600 can be assembled and the top layer 110 mechanically attached to the bottom layer 120 via attachment points to form a closed cell structure of chambers (e.g., like the chambers 470 of FIG. 5).

Figure 8:
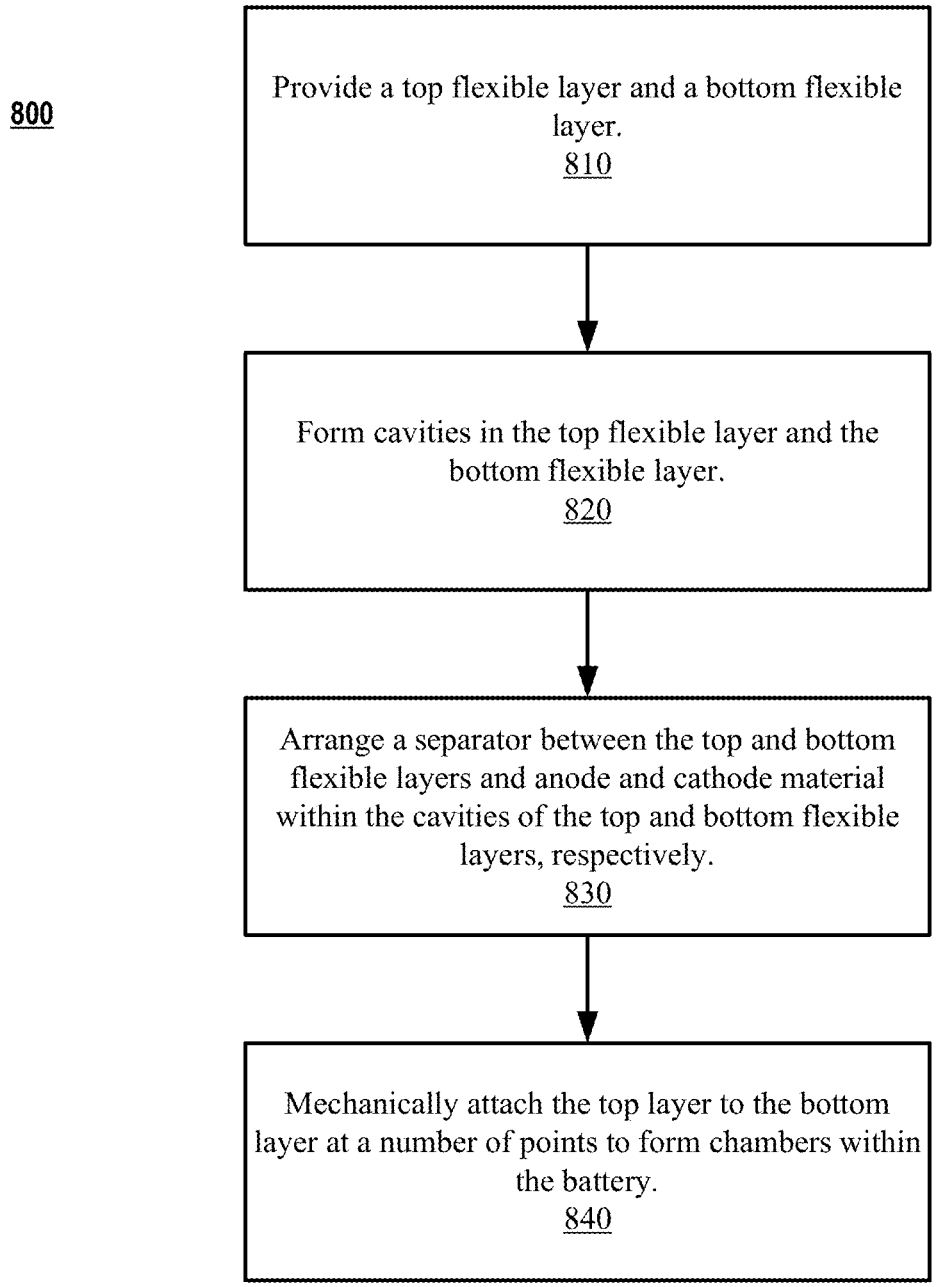
FIG. 8 illustrates an example first logic flow.

FIG. 8 illustrates an example of a logic flow 800 to manufacture a flexible battery. In general, the logic flow 800 can be implemented to manufacture a flexible battery according to the present disclosure. In some examples, the logic flow 800 can be implemented to manufacture the flexible battery 100, 200, 400, and/or 600. It is worthy to note, that the logic flow 800 is described with respect to the flexible battery 100 of FIG. 1. However, this is done for convenience and clarity and is not to be limiting.

The logic flow 800 may begin at block 810. At block 810 "provide a top flexible layer and a bottom flexible layer," the top layer 110 and bottom layer 120 can be provided. Continuing to block 820 "preform cavities in the top and bottom flexible layers," cavities (e.g., portion of the chambers defined in each of the top and bottom flexible layers can be formed as described herein. For example, cavities in the top flexible layer 110 can be formed corresponding to the portion of the chamber 270-1, 270-2, 270-3, 270-4, and 270-5 defined by the top flexible layer 110. Likewise, cavities in the bottom flexible layer 120 can be formed corresponding to the portion of the chamber 270-1, 270-2, 270-3, 270-4, and 270-5 defined by the bottom flexible layer 120.

Continuing to block 830 "arrange a separator between the top and bottom flexible layers and anode and cathode material within the cavities of the top and bottom flexible layers, respectively," the anode material 140 and cathode material 150 can be disposed within the cavities. Additionally, the separator 130 can be arranged such that the anode material 140 is between the top layer 110 and the separator 130 while the cathode material 150 is between the separator 130 and the bottom layer 120.

Continuing to block 840 "mechanically attach the top layer to the bottom layer at a number of points to form chambers within the battery," the top layer 110 can be mechanically attached to the bottom layer 120 at attachment points 160. In particular, chambers 170 can be formed within the battery 100.

Figure 9:
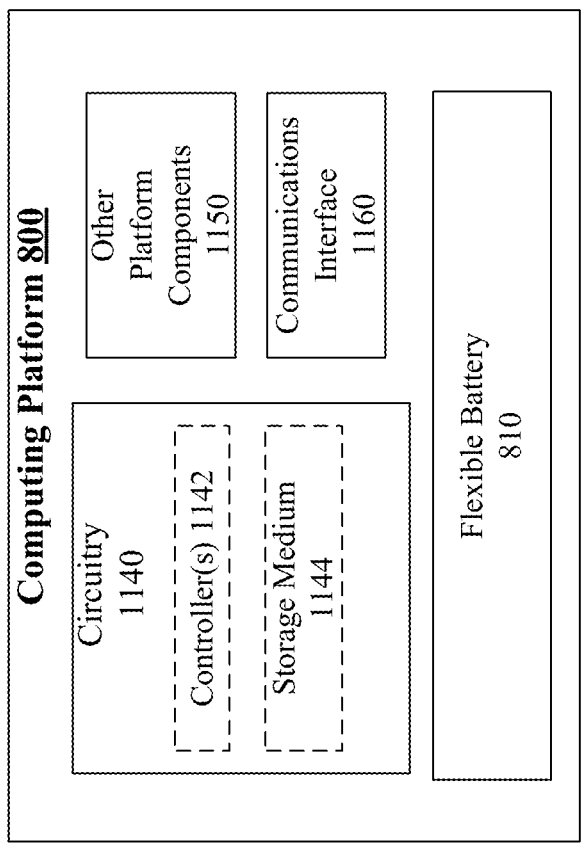
FIG. 9 illustrates an example computing platform including a flexible battery.

FIG. 9 illustrates an example system 900. In some examples, as shown in this figure, the system 900 may include a number of a processing component 910, other system components 920, a communications interface 930, or a flexible battery 940. In some examples, the flexible battery 940 may be the flexible battery 100, the flexible battery 200, the flexible battery 400, or the flexible battery 600.

According to some examples, processing component 910 may execute processing operations or logic for system 900. Processing component 910 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other system components 920 may include common computing elements or circuitry, such as one or more processors, multi-core processors, co-processors, memory units, interfaces, oscillators, timing devices, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory or any other type of storage media suitable for storing information.

In some examples, communications interface 930 may include logic and/or features to support a communication interface. For these examples, communications interface 930 may include one or more communication interfaces that operate according to various communication protocols or standards to communicate over communication links or channels. Communications may occur via use of communication protocols or standards described in one or more industry standards (including progenies and variants) such as those associated with the PCI Express, SATA, SAS (Serial Attached SCSI) standard or specifications.

Figure 10:
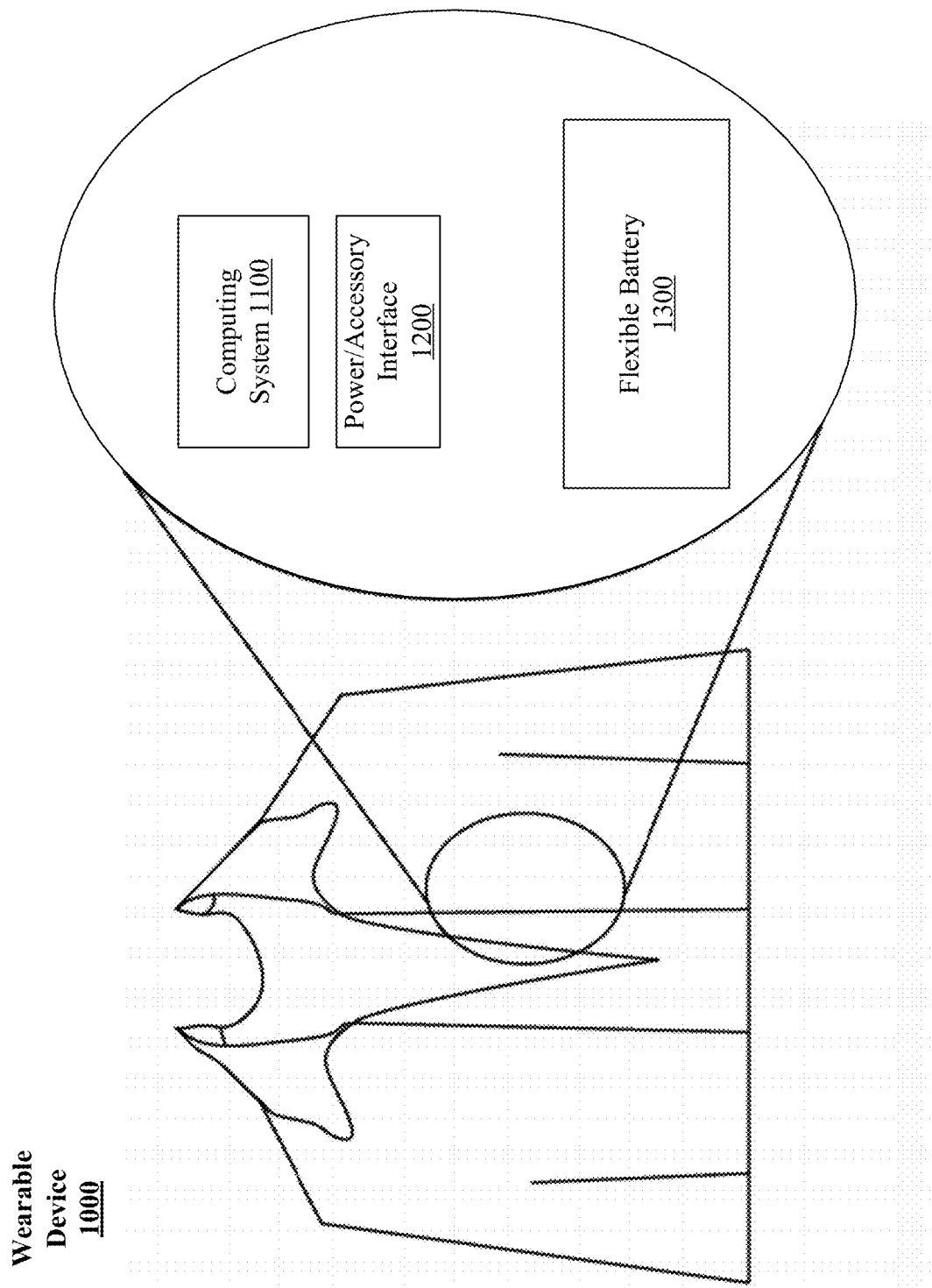
FIG. 10 illustrates an example wearable device including a flexible battery.

FIG. 10 illustrates an example wearable device 1000. In some examples, as shown in this figure, the device 1000 may include a number of a computing system 1100, a power and accessory interface 1200, or a flexible battery 1300. In some examples, the flexible battery 1300 may be the flexible battery 100, the flexible battery 200, the flexible battery 400, or the flexible battery 600.

In some examples, the flexible battery 1300 can be implemented within or as part of the wearable device 1000. It is worthy to note, that the wearable device 1000 is depicted as a coat. However, the wearable device 1000 can be implemented in any type of clothing or other wearable device. For example, the device 1000 can be a housing to work by a user, such as, a pants, a shirt, a hat, a backpack, a scarf, or the like.

The computing system 1100 can be any of a variety of computing system, such as, for example, including components of the system 900. The power and accessory interface 1200 can be any interface to operably couple the flexible battery to a power sink or power source. For example, the power and accessory interface 1200 can be a USB port, or the like.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The following examples of the present disclosure are provided.

Example 1

A flexible battery comprising: a top flexible layer; a bottom flexible layer, the bottom flexible layer coupled to the top flexible layer at a plurality of attachment points; a separator disposed between the top flexible layer and the bottom flexible layer; an anode disposed between the separator and the top flexible layer; and a cathode disposed between the separator and the bottom flexible layer.

Example 2

The flexible battery of example 1, the attachment points to couple the top flexible layer to the bottom flexible layer to form a plurality of chambers.

Example 3

The flexible battery of example 2, the attachment points to maintain a shape of each of the plurality of chambers under an increase in internal pressure.

Example 4

The flexible battery of example 3, comprising a plurality of battery cells, each of the chambers a one of the plurality of battery cells.

Example 5

The flexible battery of example 2, wherein the plurality of chambers are at least partially open to each other.

Example 6

The flexible battery of example 5, the anode comprising a first fluid material and the cathode comprising a second fluid material, the first fluid material and the second fluid material to flow between the plurality of chambers on respective sides of the separator.

Example 7

The flexible battery of example 1, the separator comprising a flexible polymer.

Example 8

The flexible battery of example 1, comprising: an anode current collector disposed between the separator and the top flexible layer; and a cathode current collector disposed between the separator and the bottom flexible layer.

Example 9

A system comprising: a processing component; and a battery operably coupled to the processing component, the battery comprising: a top flexible layer; a bottom flexible layer, the bottom flexible layer coupled to the top flexible layer at a plurality of attachment points; a separator disposed between the top flexible layer and the bottom flexible layer; an anode disposed between the separator and the top flexible layer; and a cathode disposed between the separator and the bottom flexible layer.

Example 10

The system of example 9, the attachment points to couple the top flexible layer to the bottom flexible layer to form a plurality of chambers.

Example 11

The system of example 10, the attachment points to maintain a shape of each of the plurality of chambers under an increase in internal pressure.

Example 12

The system of example 11, the battery comprising a plurality of battery cells, each of the chambers a one of the plurality of battery cells.

Example 13

The system of example 9, wherein the plurality of chambers are at least partially open to each other.

Example 14

The system of example 13, the anode comprising a first fluid material and the cathode comprising a second fluid material, the first fluid material and the second fluid material to flow between the plurality of chambers on respective sides of the separator.

Example 15

The system of example 9, the separator comprising a flexible polymer.

Example 16

The system of example 9, the battery comprising: an anode current collector disposed between the separator and the top flexible layer; and a cathode current collector disposed between the separator and the bottom flexible layer.

Example 17

The system of example 9, comprising a communication interface operably coupled to the processor component.

Example 18

A wearable device comprising: a housing to be worn by a user; and a battery disposed within the housing, the battery comprising: a top flexible layer; a bottom flexible layer, the bottom flexible layer coupled to the top flexible layer at a plurality of attachment points; a separator disposed between the top flexible layer and the bottom flexible layer; an anode disposed between the separator and the top flexible layer; and a cathode disposed between the separator and the bottom flexible layer.

Example 19

The wearable device of example 18, the attachment points to couple the top flexible layer to the bottom flexible layer to form a plurality of chambers.

Example 20

The wearable device of example 19, the attachment points to maintain a shape of each of the plurality of chambers under an increase in internal pressure.

Example 21

The wearable device of example 20, the battery comprising a plurality of battery cells, each of the chambers a one of the plurality of battery cells.

Example 22

The wearable device of example 18, wherein the plurality of chambers are at least partially open to each other.

Example 23

The wearable device of example 22, the anode comprising a first fluid material and the cathode comprising a second fluid material, the first fluid material and the second fluid material to flow between the plurality of chambers on respective sides of the separator.

Example 24

The wearable device of example 18, the separator comprising a flexible polymer.

Example 25

The wearable device of example 18, the battery comprising: an anode current collector disposed between the separator and the top flexible layer; and a cathode current collector disposed between the separator and the bottom flexible layer.

Example 26

A method comprising: providing a top flexible layer; providing a bottom flexible layer; coupling the top flexible layer to the bottom flexible layer at a plurality of attachment points; positioning a separator between the top flexible layer and the bottom flexible layer; disposing an anode between the separator and the top flexible layer; and disposing a cathode disposed between the separator and the bottom flexible layer.

Example 27

The method of example 26, comprising charging the anode and cathode to provide a battery.

Example 28

The method of example 27, the attachment points to couple the top flexible layer to the bottom flexible layer to form a plurality of chambers.

Example 29

The method of example 28, the attachment points to maintain a shape of each of the plurality of chambers under an increase in internal pressure.

Example 30

The method of example 27, wherein the plurality of chambers are at least partially open to each other.

Example 31

The method of example 30, the anode comprising a first fluid material and the cathode comprising a second fluid material, the first fluid material and the second fluid material to flow between the plurality of chambers on respective sides of the separator.

Example 32

The method of example 27, the separator comprising a flexible polymer.

Example 33

The method of example 27, comprising: disposing an anode current collector disposed between the separator and the top flexible layer; and disposing a cathode current collector disposed between the separator and the bottom flexible layer.

Example 34

An apparatus comprising formed from the method of any one of examples 26 to 33.

What is claimed is:

1. A flexible battery comprising:
   a top flexible layer;
   a bottom flexible layer, the bottom flexible layer directly coupled to the top flexible layer at a plurality of attachment points to form a plurality of chambers;
   a separator disposed between the top flexible layer and the bottom flexible layer, the separator comprising a flexible polymer electrolyte material;
   an anode disposed between the separator and the top flexible layer; and
   a cathode disposed between the separator and the bottom flexible layer.

2. The flexible battery of claim 1, the attachment points to maintain a shape of each of the plurality of chambers under an increase in internal pressure.

3. The flexible battery of claim 2, comprising a plurality of battery cells, each of the chambers a one of the plurality of battery cells.

4. The flexible battery of claim 1, wherein the plurality of chambers are at least partially open to each other.

5. The flexible battery of claim 4, the anode comprising a first fluid material and the cathode comprising a second fluid material, the first fluid material and the second fluid material to flow between the plurality of chambers on respective sides of the separator.

6. The flexible battery of claim 1, comprising:
   an anode current collector disposed between the separator and the top flexible layer; and
   a cathode current collector disposed between the separator and the bottom flexible layer.

7. A system comprising:
   a processing component; and
   a battery operably coupled to the processing component, the battery comprising:
   a top flexible layer;
   a bottom flexible layer, the bottom flexible layer directly coupled to the top flexible layer at a plurality of attachment points to form a plurality of chambers;
   a separator disposed between the top flexible layer and the bottom flexible layer, the separator comprising a flexible polymer electrolyte material;
   an anode disposed between the separator and the top flexible layer; and
   a cathode disposed between the separator and the bottom flexible layer.

8. The system of claim 7, the attachment points to maintain a shape of each of the plurality of chambers under an increase in internal pressure.

9. The system of claim 8, the battery comprising a plurality of battery cells, each of the chambers a one of the plurality of battery cells.

10. The system of claim 7, wherein the plurality of chambers are at least partially open to each other.

11. The system of claim 10, the anode comprising a first fluid material and the cathode comprising a second fluid material, the first fluid material and the second fluid material to flow between the plurality of chambers on respective sides of the separator.

12. The system of claim 7, the battery comprising
    an anode current collector disposed between the separator and the top flexible layer; and
    a cathode current collector disposed between the separator and the bottom flexible layer.

13. The system of claim 7, comprising a communication interface operably coupled to the processing component.

14. A wearable device comprising:
    a housing to be worn by a user; and
    a battery disposed within the housing, the battery comprising:
    a top flexible layer;
    a bottom flexible layer, the bottom flexible layer directly coupled to the top flexible layer at a plurality of attachment points to form a plurality of chambers;
    a separator disposed between the top flexible layer and the bottom flexible layer, the separator comprising a flexible polymer electrolyte material;
    an anode disposed between the separator and the top flexible layer; and
    a cathode disposed between the separator and the bottom flexible layer.

15. The wearable device of claim 14, the attachment points to maintain a shape of each of the plurality of chambers under an increase in internal pressure.

16. The wearable device of claim 15, the battery comprising a plurality of battery cells, each of the chambers a one of the plurality of battery cells.

17. The wearable device of claim 14, wherein the plurality of chambers are at least partially open to each other.

18. The wearable device of claim 17, the anode comprising a first fluid material and the cathode comprising a second fluid material, the first fluid material and the second fluid material to flow between the plurality of chambers on respective sides of the separator.

19. The wearable device of claim 14, the battery comprising
   an anode current collector disposed between the separator and the top flexible layer; and
   a cathode current collector disposed between the separator and the bottom flexible layer.

20. The flexible battery of claim 1, wherein the anode and the cathode comprising a mesh structure and wherein the top flexible layer is mechanically coupled to the bottom flexible layer at the plurality of attachment points between gaps in the mesh structure.

21. The system of claim 7, wherein the anode and the cathode comprising a mesh structure and wherein the top flexible layer is mechanically coupled to the bottom flexible layer at the plurality of attachment points between gaps in the mesh structure.

22. The wearable device of claim 14, wherein the anode and the cathode comprising a mesh structure and wherein the top flexible layer is mechanically coupled to the bottom flexible layer at the plurality of attachment points between gaps in the mesh structure.

\* \* \* \* \*